Nov. 27, 1951  M. A. STICELBER  2,576,369
TRAVELING OVEN UNLOADER
Filed Sept. 19, 1949  5 Sheets-Sheet 2

INVENTOR.
MERLIN A. STICELBER
BY
Alfred R. Fuchs
ATTORNEY

Nov. 27, 1951 M. A. STICELBER 2,576,369
TRAVELING OVEN UNLOADER
Filed Sept. 19, 1949 5 Sheets-Sheet 4

INVENTOR.
MERLIN A. STICELBER
BY
Alfred R. Fuchs
ATTORNEY

Nov. 27, 1951 M. A. STICELBER 2,576,369
TRAVELING OVEN UNLOADER
Filed Sept. 19, 1949 5 Sheets-Sheet 5

INVENTOR.
MERLIN A. STICELBER
BY
Alfred R. Fuchs
ATTORNEY

Patented Nov. 27, 1951

2,576,369

UNITED STATES PATENT OFFICE 2,576,369

TRAVELING OVEN UNLOADER

Merlin A. Sticelber, Kansas City, Mo., assignor to Stickelber & Sons, Inc., a corporation of Missouri Application September 19, 1949, Serial No. 116,451

20 Claims. (Cl. 198—79)

My invention relates to oven unloading devices, and more particularly to a device for unloading a traveling oven, such as used for baking bread.

In traveling ovens for baking bread, the hearth or baking surface is made up of conveyor sections that constitute hearth sections, said sections being linked together to form a chain-like conveyor belt that carries the bread to be baked from the entrance end to the exit end of the oven lengthwise thereof. Ordinarily bread baked in an oven of this character is in pans and, ordinarily the pans are strapped together in groups. Whether the pans are strapped together in groups or are individual or separate pans, the size of the oven is such that ordinarily a plurality of pans are being discharged from the oven crosswise of the discharge opening thereof either simultaneously or relatively close together, crosswise of the conveying means that carries the pans containing the bread through the oven. It is necessary to remove the bread from the pans and it has been customary to either remove the bread from the pans by a manual operation at the discharge end of the oven and deposit the bread removed from the pans on a transverse conveyor member, or to transfer the pans by hand to a transverse conveyor member that carries the pans to a de-panning apparatus, or apparatus for removing the bread from the pans.

Ordinarily in a commercial bakery of any size, the ovens in use are of such a character that at least four parallel lines of pans or groups of pans are traveling through the oven at the same time, and accordingly four pans or four groups of pans can be discharged from the oven simultaneously. As the baked bread in the pans is thus reaching the point where it has to be handled in such a manner that more than one panful has to be handled either at the same time or very close to the same time that another pan reaches the point where it has to be handled by men stationed at the discharge end of the oven, it has been necessary to provide two or more men at the discharge end of these traveling ovens to take care of the bread as it discharges from the oven and transfer it to the conveyor, either in or out of the pans, as the case may be. Because of this manual operation being required, the advantage of automatic de-panning or removing the bread from the pans is largely lost. It is a purpose of my invention to entirely eliminate this manual operation and transfer the bread in the pans from the oven to a transversely operating conveyor in such a manner that the pans containing the bread will be spaced along the transversely operating conveyor and one pan of bread will not be deposited on top of another pan of bread in being transferred to said transversely extending conveyor.

The apparatus illustrated in the accompanying drawings is provided to transfer as many as four groups of pans discharged from a traveling oven simultaneously to a conveyor belt, which operates crosswise of the direction in which the bread has been traveling through the oven during the baking operation. The number of pans transferred can, of course, be varied as may be found desirable, dependent upon the capacity of the oven and particularly the width of the oven, which determines the amount of pans that can be discharged from the oven at the same time.

It is a further purpose of my invention to provide an apparatus for unloading a traveling oven, comprising a plurality of conveyors extending from the discharge end of the oven and traveling away from the oven toward a transversely extending conveyor, and to provide means for transferring pans from said plurality of conveyors that extend away from the discharge end of the oven to the transversely extending conveyor at spaced points along that transversely extending conveyor.

More specifically my invention comprises transfer means for accomplishing the above referred to purpose, that includes a releasable barrier associated with each of the plurality of conveyors, preferably, extending in parallelism and side by side from the discharge end of the oven, and means for controlling the operation of these barriers so as to transfer the pans from the parallel conveyors to the transversely extending conveyor so that said pans will be deposited on the transverse conveyor at spaced points and not on top of each other or in engagement with each other.

It is a further purpose of my invention to provide controlling means for the releasing means that operates to permit the pans to be transferred from the one set of conveyors to the other conveyor, which comprises timing means that operates periodically to control the position of the releasable barriers, but the operation of which is dependent upon whether a pan is in engagement with the barrier at the time that the timing means reaches a position to release the barrier.

It is a further purpose of my invention to provide said controlling means with means for preventing the release of the barrier unless a pan is in position against the barrier when the timing means is in a barrier releasing position, said means comprising a member that is adapted to block the release of the barrier when a pan is in engagement with the barrier at the time that such release would otherwise take place.

By provision of the controlling means above referred to, it requires that both a pan be in engagement with the barrier and the timing means be in a position to release the barrier, for said barrier to move out of pan holding position. This makes it impossible for a pan to move off any one of the parallel conveyors that lead from the discharge end of the oven, except when the timing means releases the barrier. Thus all pans that are ready for release at the time the timing means operates will be discharged to the transverse conveyor simultaneously and any pans that are not ready for release at the time will not be discharged onto the transversely operating conveyor belt from the parallel conveyors leading from the discharge end of the oven.

Other objects and advantages of my invention will appear as the description of the drawings proceeds. I desire to have it understood, however, that I do not intend to limit myself to the particular details shown or described, except as defined in the claims.

Figure 2:
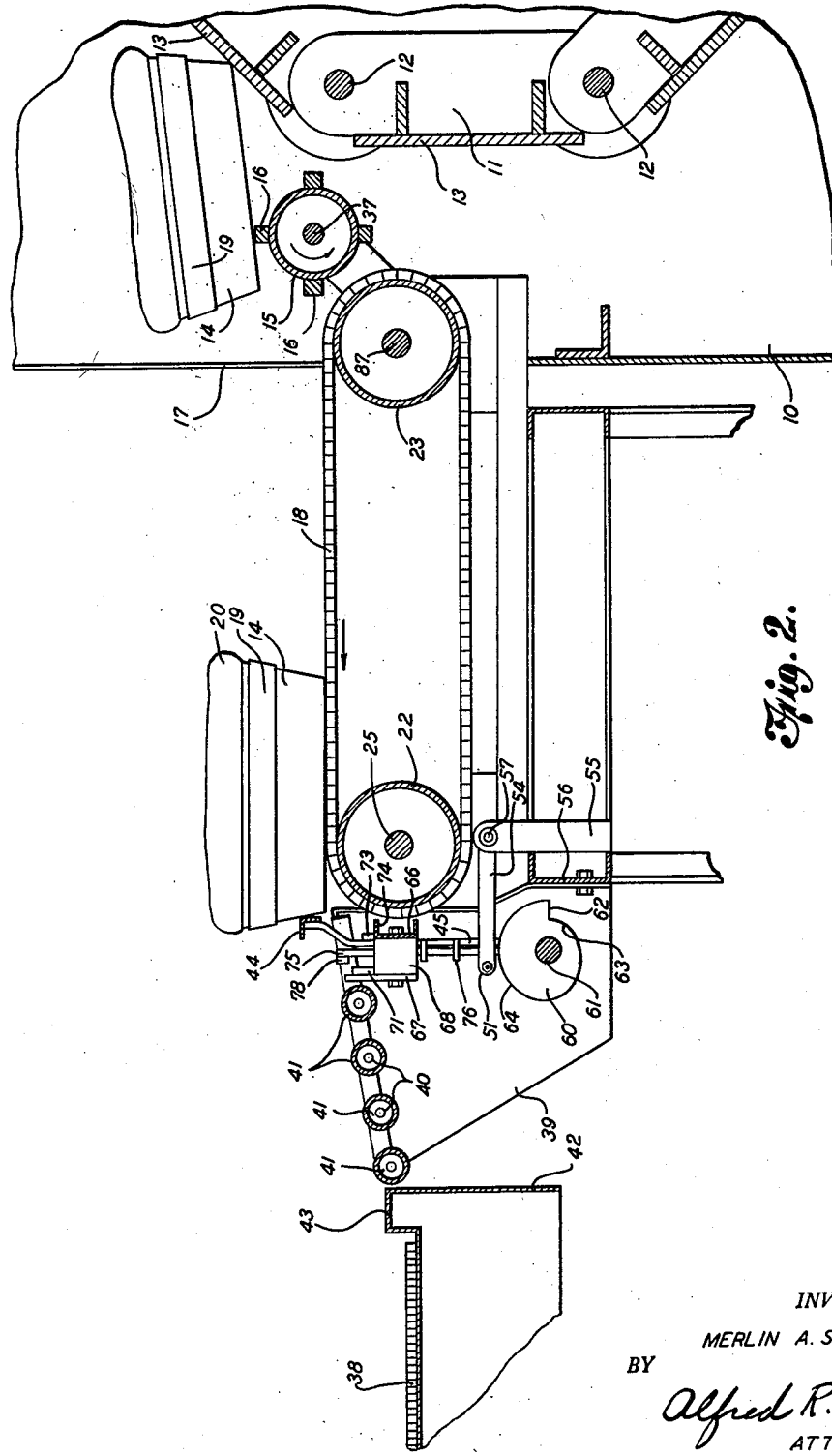
Fig. 2 is a section taken on the line 2—2 of Fig. 1, through my unloading apparatus, showing a fragmentary portion of the oven and the transverse conveyor in vertical section.

Referring in detail to the drawings, my improved oven unloading device is shown in Fig. 2 as being mounted at the discharge end of a baking oven 10 that is provided with a traveling hearth comprising conveying means 11 in the form of pivotally connected bars having pivot pins 12 for connecting the adjacent conveyor sections and having hearth sections or baking plates 13 on each of the conveyor sections. The plate-like members 13 may extend across the entire oven or there may be a plurality of linked members carrying said plates side by side across the oven, as may be found desirable. The particular structure of the conveyor within the oven is not part of this invention, but the invention relates to the unloading of an oven having the general type of traveling pan carrying means for transporting the pans through the oven shown in Fig. 2 of the drawings. The baking pans 14 will leave the inclined plate-like member 13, which is traveling downwardly and to the left as the conveyor is operated, as viewed in Fig. 2, and are engaged by a fluted roller 15 having ribs or vanes 16 thereon, said roller rotating in the direction indicated by the arrow in Fig. 2 to aid in the transfer of pans or groups of pans from the conveyor within the oven out through the discharge opening 17 of the oven onto one of a plurality of conveyors 18 forming a part of the unloading means.

Ordinarily the pans 14 are secured together in groups or sets and it is customary to mount four pans in a group by securing the same together by means of a strap, such as the strap 19. The loaves of bread in the pans are indicated at 20. Traveling ovens in commercial use are usually of such a width that there are four rows of pans traveling through the oven in more or less parallel lines or rows at the same time, or in other words, there may be four groups or sets of pans at any one point crosswise of the oven at one time, each of said groups or sets of pans being made up of four pans strapped together, or any desired number of pans secured together, as the case may be. Thus the pans will be discharged from the oven at its discharge end at approximately four locations crosswise of the discharge end of the oven.

Figure 1:
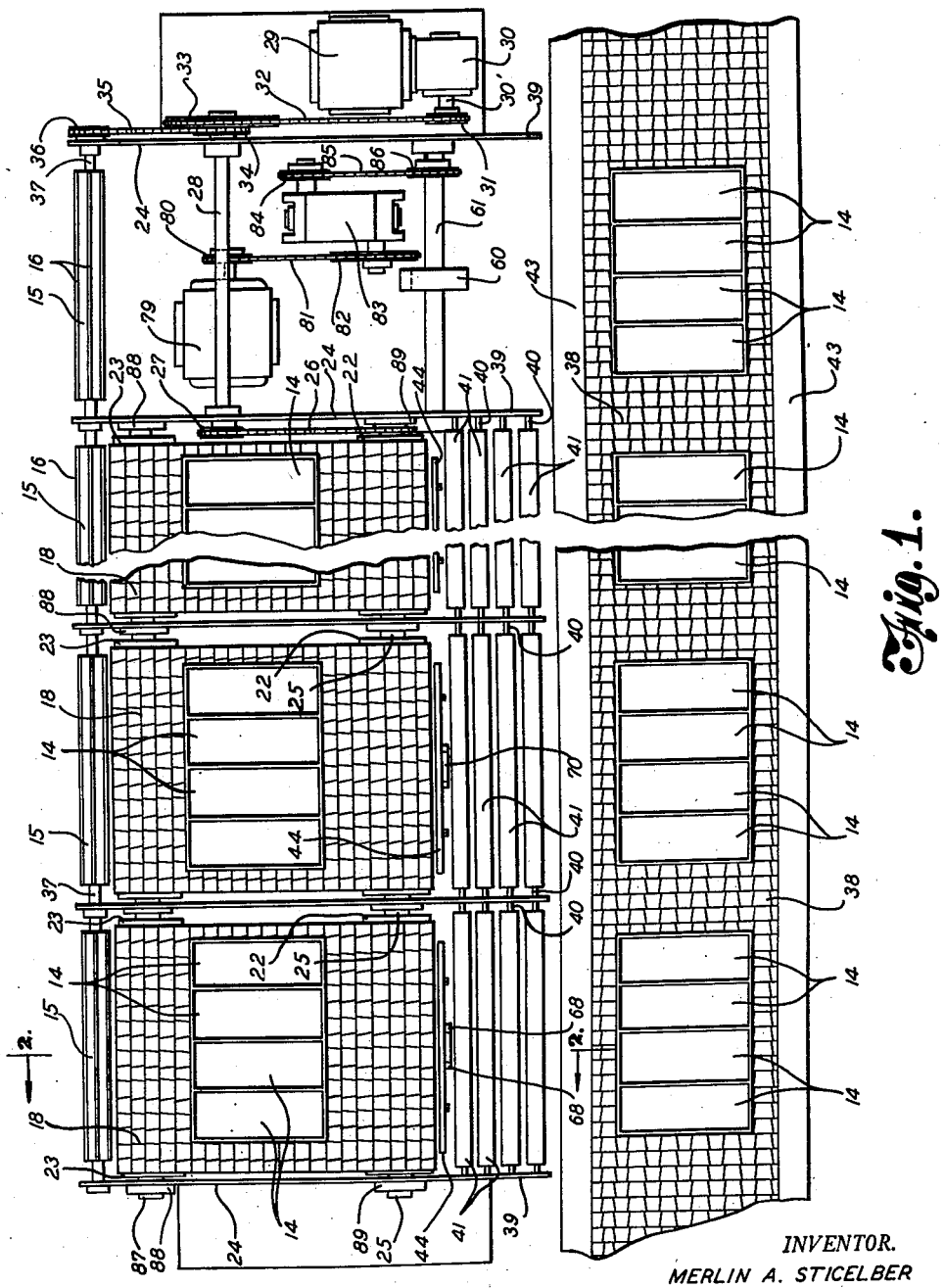
Fig. 1 is a plan view, partly broken away, of my improved oven unloading apparatus.

As it is desirable to control each set of pans after it is discharged from the oven so as to obtain orderly transfer thereof to a conveyor that will carry the groups of pans to de-panning or pan unloading apparatus, I have provided four conveyors 18 extending from the discharge end of the oven, each of said conveyors being so located that these will receive the pans in one of the rows that are traveling through the oven. I also provide a fluted or ribbed roller 15 for each conveyor 18, as will be obvious from Fig. 1. The number of conveyors 18 that are provided may, of course, vary with the width of the oven, but my invention is applicable to any oven of such a width that more than one set of pans can leave the oven at the same time, and thus the number of conveyors 18 can be two or more.

Each of the conveyors 18 is made up of a plurality of links 21 pivotally connected together, and each of said chain mesh conveyors 18 operates over rollers 22 and 23. Said rollers are mounted on shafts that are mounted in suitable bearings in a frame having longitudinal members 24, as are also the fluted rollers 15. The rollers 22 are the driven rollers and all said rollers are mounted on a common shaft 25, which has a sprocket fixed thereon over which the sprocket chain 26 extends, which also extends over a sprocket wheel 27 mounted on the shaft 28, which is mounted in suitable bearings on the frame.

The shaft 28 is driven from the motor 29 through a reduction gearing 30, the output shaft 30' of said reduction gearing having a sprocket 31 thereon over which the sprocket chain 32 operates, that operates over a sprocket wheel 33 fixed on the shaft 28. The shaft 28 also has a sprocket wheel 34 thereon, over which the sprocket chain 35 operates that operates over a sprocket wheel 36 that is fixed on a common shaft 37 for all of the fluted rollers 15. Said conveyor belts 18 thus all move at the same lineal speed and the fluted rollers 15 all rotate at the same rate. The conveyor members 18 have the top runs thereof traveling in the direction indicated by the arrow adjacent thereto in Figs. 2 and 3, or from the discharge end of the oven conveyor toward a transverse conveyor 38, which may travel either to the right or left as viewed in Fig. 1, the conveyor 38 being a belt conveyor of a chain mesh, similar to the conveyor belts 18, said conveyor 38 traveling in a direction transverse to that of the conveyor belts 18, as will be obvious from Fig. 1.

The frame of my unloading apparatus has plate-like extensions 39 thereon that are part of the longitudinal frame members, that are provided with suitable bearings for the shafts 40 of conveyor rollers 41, said rollers 41 being mounted on the plate-like members 39 in such manner that each thereof is arranged at a lower level than the next adjacent one so that these are arranged in descending relationship from the discharge end of the conveyor belts 18 toward the conveyor belt 38, as will be obvious from Fig. 2. Thus the rollers 41 provide a gravity roller conveyor down which the pans 14 will travel rapidly, after coming into engagement therewith, to be deposited on the conveyor belt 38. The conveyor belt 38 is mounted in a suitable conveyor frame 42, which may have a shelf-like ledge 43 along opposite sides thereof, over which the pans will travel from the rollers 41 onto the belt 38, the raised ledges 43 serving to confine the pans to the conveyor belt 38 after transfer thereto.

The conveyor belt 38 is driven in any suitable manner at a much higher rate of speed than the conveyors 18 and serves to carry the pans or group of pans, as illustrated, to other apparatus, such as de-panning means, which it is desired that the pans should reach in an orderly manner, Furthermore it is necessary, in order that the bread be not damaged, that the transfer to the conveyor 38 be such that one group of pans will not be deposited on top of another group of pans, or partly on top of another group of pans. In order that the apparatus to which the pans are to be carried by the conveyor 38 will function properly, the pans on the conveyor 38 must not be closer together than a certain minimum distance, but can be further apart. My unloading apparatus transfers the pans from the conveyors 18 to the conveyor 38 in such a manner that these requirements are maintained.

In order to accomplish this it is necessary that a group of pans 14 be discharged from each conveyor belt only at a definite time and that if a group of pans is discharged from any one of said conveyor belts it can only be discharged therefrom at that definite time. The time intervals at which such discharge may take place are definitely fixed by my unloading mechanism, and means is provided preventing the discharge of pans from a conveyor belt 18 to the conveyor belt 38 at any other time except the time intervals that are regulated by the apparatus. Accordingly if there are groups of pans discharged from all the conveyor belts they will be discharged at the same time and will reach the conveyor belt 38 at the same time and will have a definite spacing from each other on the conveyor belt 38, and if there are groups of pans discharged from a lesser number of conveyor belts 18 these will also all be discharged at the same time and will occupy a certain definite spacing from each other so that no two groups of pans can be discharged on top of each other or in engagement with each other on the conveyor belt 38.

The means for accomplishing this comprises barriers that are associated with each of the conveyor belts 18 and means for controlling the position of said barriers to accomplish the above referred to control of the discharge of the pans. The barriers are in the form of angle members 44, which are adapted to be moved into the position shown in Fig. 3, in which these barriers will be so located that pans 14 traveling with the conveyor belts 18 will be halted by engagement with said barriers 44. The barriers 44 are mounted on frame members 45 that have upper transverse portions 46 that are inclined so as to provide a laterally offset portion 47 at the upper margin of each of said frames carrying the angle member 44.

Said frames are generally rectangular in shape, having a lower transverse member 48 and upstanding side members 49, as well as a central upstanding member 50. Ears 51 extend laterally from the frame 45 and have pivot openings 52 therein, through which pivot members 53 in the form of bolts extend. Said pivot members 53 pivotally connect the frames 45 with links 54 that are pivotally mounted on upstanding brackets 55 mounted on channel members 56 that form part of the frame of the machine, a pivot pin 57 pivotally connecting said links with the brackets, there being spacing sleeves 58 mounted on the pivot pins 57 to properly space the links 54.

The lower edge portion 59 of each frame 45 is adapted to engage with a cam 60. There is a cam 60 for each frame member 45 and a frame member 45 and a barrier 44 for each conveyor 18. The cams 60 are fixed on the shaft 61 and are all alike and are all set on the shaft so that the shoulders 62 of said cams are all in alignment with each other axially of the shaft 61. The frames 45 are thus adapted to be moved up and down by means of the cams 60 between the full line position thereof shown in Fig. 3 to the dotted line position thereof shown in Fig. 6. It will be noted that the ears 51 are located slightly above the bottom edge 59 of the frame 45, and that the links 54 are located at points, where there will be no interference with the operation of the cams 60, being spaced longitudinally of the shaft 61 from said cams.

Each of said cams has a low portion 63 adjacent the shoulder 62, a high portion 64 extending around a large portion of the surface of the cam, and a rising portion 65 that extends from the low portion 63 to the high portion 64. Thus as the cam rotates in the direction indicated by the arrow in Fig. 3, the frame 45 will be held in raised position until the shoulder 62 is reached, whereupon it will drop downwardly onto the lower portion 63 of the cam, provided there is nothing to prevent such movement, as explained below. After the low portion 63 of the cam has been passed the frame 45 will be rather rapidly raised back to the position shown in Fig. 3 as the bottom edge 59 thereof travels along the rising portion 65 of the cam, and will remain in such raised position for the entire time that the bottom edge 59 of said member 45 is in engagement with the high portion 64 of the cam. As shown in the drawings, the high portion 64 of the cam extends over half way around the circumference of the cam and the low portion over about one-quarter thereof. Thus under influence of the cam the members 45 will be in raised position over half of the time while the apparatus is operating, and will be raised to such position in less than one fourth of a rotation of the cam.

Mounted on the transverse frame member 66 is a guide comprising a plate 67 and a pair of blocks 68 through which fastening elements 69 extend for securing the plate 67 in spaced relation to the frame member 66, providing a passage 70 through which the upstanding member 50 of the frame 45 extends. The plate 67 also has a plate 71 secured to the inner face thereof providing a shoulder 72 on the inner face of said plate 67.

Figure 3:
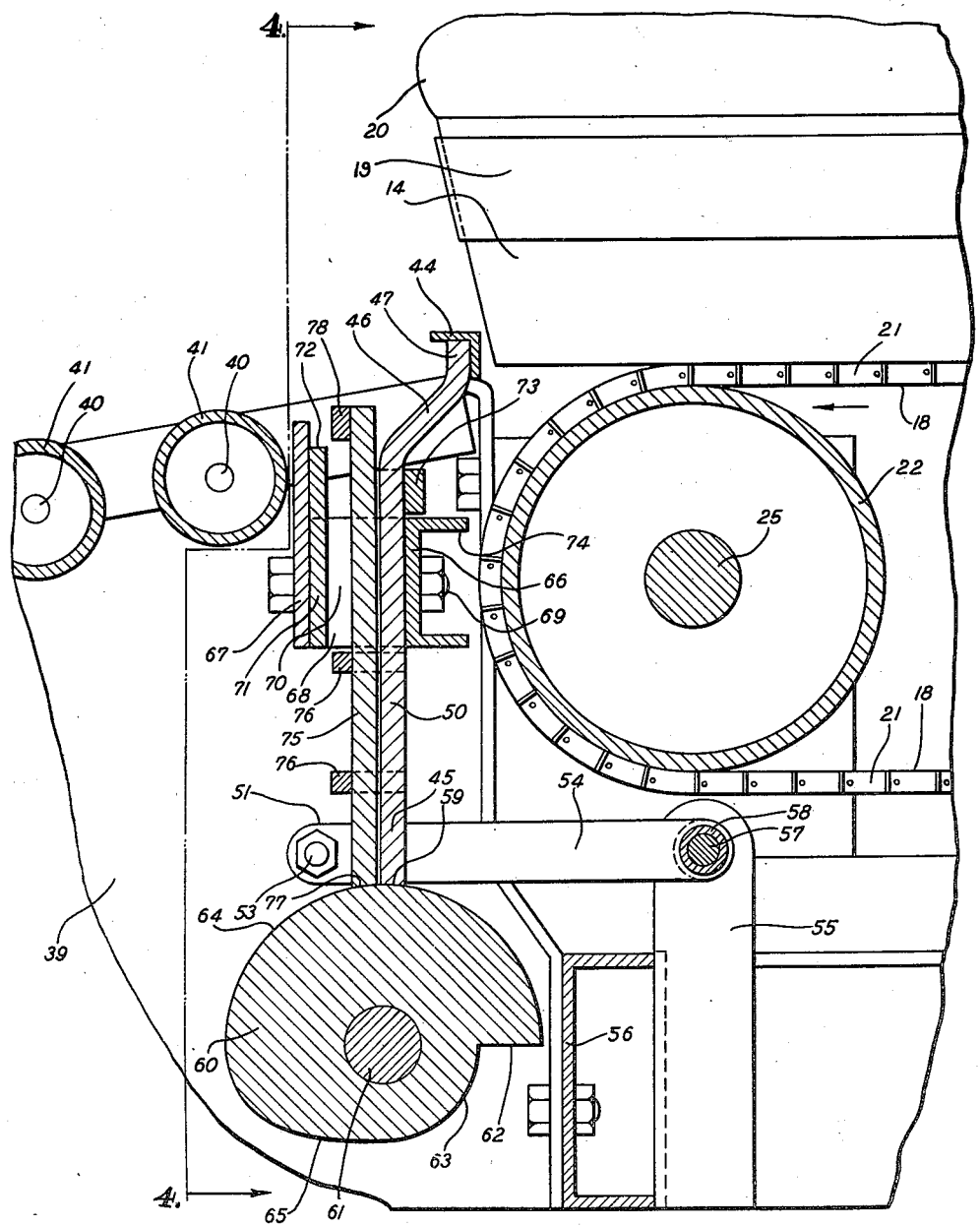
Fig. 3 is an enlarged fragmentary sectional view through the means for transferring the pans from one of the longitudinal conveyors to the transverse conveyor, showing the controlling means in vertical section.
Figure 4:
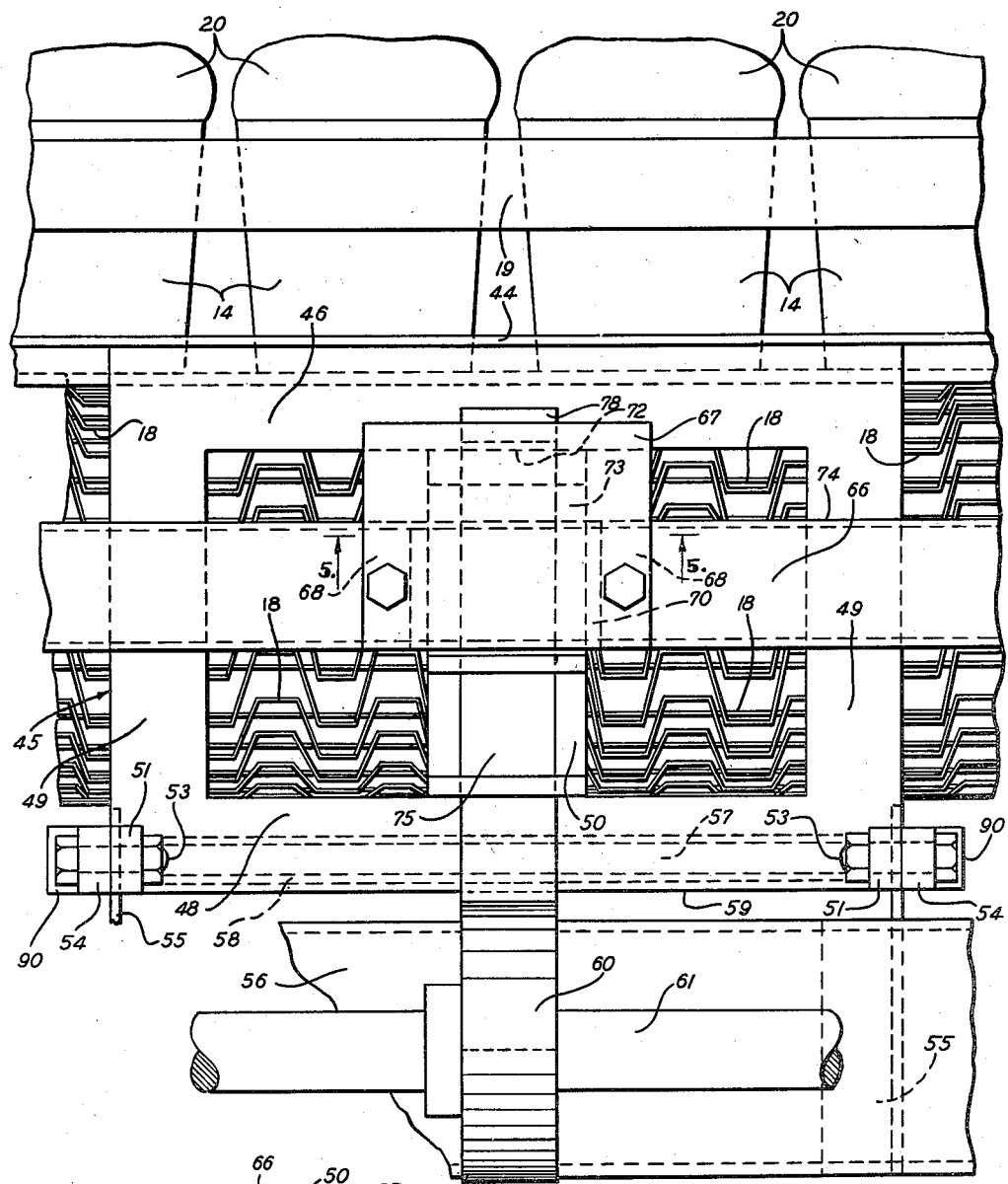
Fig. 4 is a fragmentary sectional view taken on the line 4—4 of Fig. 3.
Figure 5:
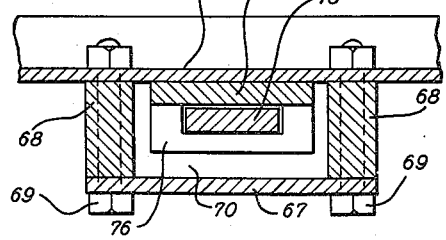
Fig. 5 is a transverse sectional view through the controlling means, taken on the line 5—5 of Fig. 4.

A transverse bar 73 is provided on the upstanding member 50 that is adapted to rest on the top flange 74 of the frame member 66, serving as a stop member to limit downward movement of the frame member 45 from the position shown in Fig. 3. Due to the pivotal mounting of the member 45 it is overbalanced so that it will tend to slide along the member 66 from the dotted line position thereof shown in Fig. 6 to the full line position thereof shown in Fig. 3, and thus will be in a position that the stop member 73 will engage with the stop provided by the top flange 74 of the channel member 66. However, since the frame 45 is pivotally mounted, if a pan engages with the barrier 44 with the parts in the position shown in Fig. 3, the action of the conveyor 18 will cause the pan 14 to move the barrier 44 and thus the frame 45 to the left or counter-clockwise about the pivot 53. When sufficient of such counter-clockwise movement takes place the stop member 73 will be moved into alignment with the passage 70 and the frame member 45 can drop to the dotted line position thereof shown in Fig. 6.

Means is provided for blocking the passage 70 so that this can not take place when it is not desired to have a pan 14 discharge from the conveyor 18. The means for preventing or blocking such movement of the frame member 45 comprises a locking member or slide 75, which is slidably mounted on the upstanding member 50, a pair of guides 76 being provided for the member 75 to maintain it in substantial parallelism to the upstanding frame member 50 during its movements up and down relative thereto. The lower end 77 of the locking member 75 also engages the surface of the cam 60 and will be moved up and down responsive to the rotation of the cam 60 when this is desired.

Figures 6, 7:
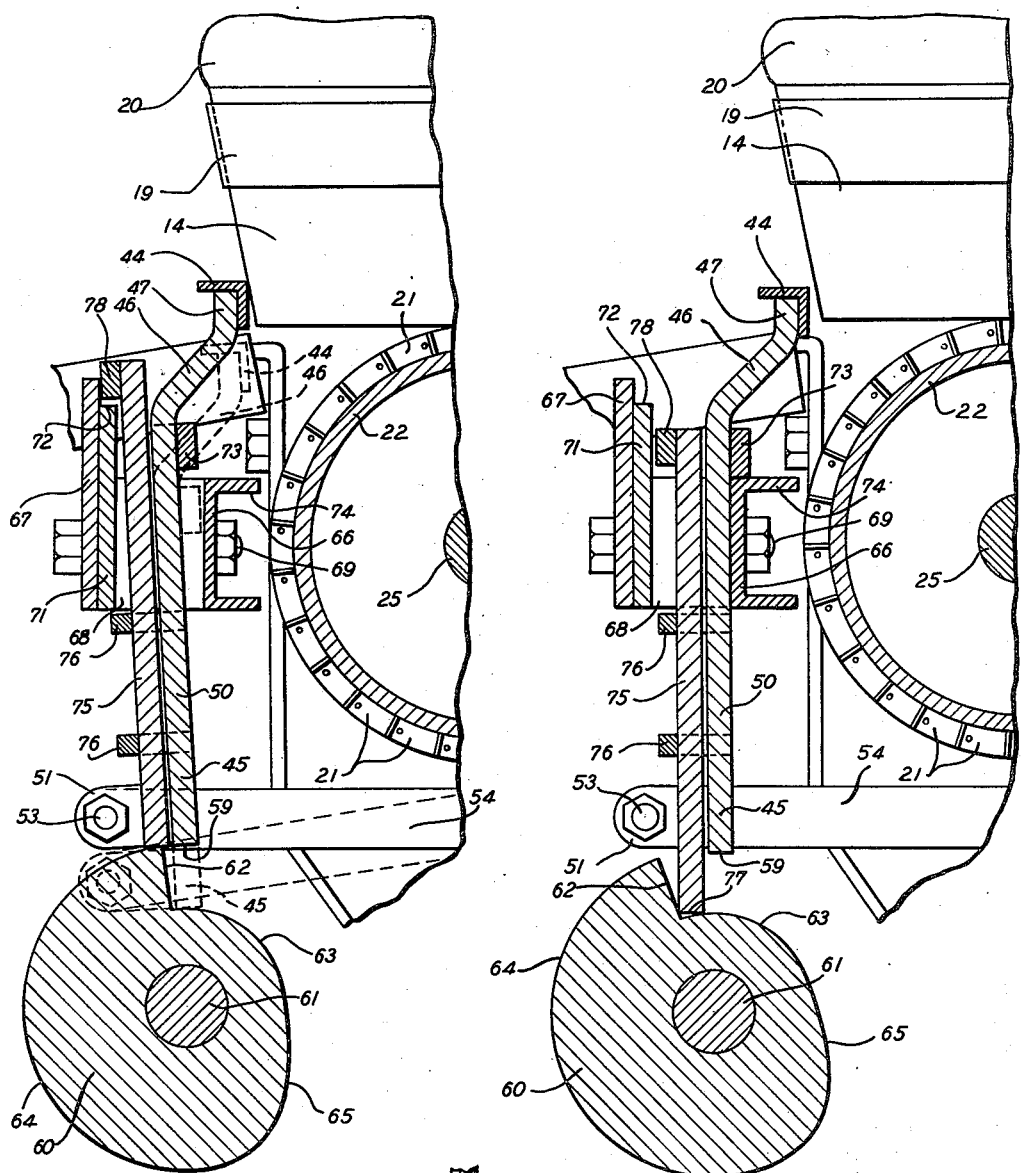
Fig. 6 is an enlarged fragmentary sectional view through the means for controlling transfer of pans from one of the longitudinal conveyors to the transverse conveyor, the parts being in the position that these would have just prior to release and transfer of a pan.
Fig. 7 is a view similar to Fig. 6, showing the position of the parts when no pan is ready for transfer at the time when transfer would otherwise take place.
Figure 8:
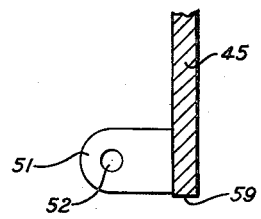
Fig. 8 is a fragmentary elevational view of the lower end portion of the barrier carrying member.

Said member 75 also has a bar 78 extending transversely thereof at its upper end, which is adapted to engage the shoulder 72 when it is not desired that the member 75 move downwardly upon reaching the shoulder 62 of the cam. Thus when there is a pan 14 in engagement with the barrier 44 at any time that the barrier 44 is in raised position due to the action of the cam 60, the pan 14, due to the action of the conveyor 18, will move the frame 45 on its pivots so as to align the bar 78 serving as a stop member, with the shoulder 72 as shown in Fig. 6. When the parts are in the position shown in Fig. 6 the frame 45 can drop off the shoulder 62 of the cam to the dotted line position shown therefor and the barrier 44 will be moved out of the way of the pan 14. The pan can then slide over the top of the barrier 44 and roll down on the roller conveyor made up of the rollers 41 onto the conveyor belt 38. If there is no pan in engagement with the barrier 44 during any part of the rotation of the cam when the frame 45 is in engagement with the high portion 64 of the cam, then the parts will move into the position shown in Fig. 7 when the shoulder 62 of the cam is reached. The tendency of the frame 45 to lean toward the right at its upper end will cause the stop bar 73 to remain in position on the ledge 74 provided by the top flange of the frame member 66.

This will leave a space between the plate-like member 71 and the frame member 45 sufficient for the slidably mounted locking member 75 to slide through the guide 76 and drop off the shoulder 62 of the cam to the low portion 63 of said cam. When the member 75 reaches this position, then it will be so located that until it has reached the high portion of the cam or substantially reached the high portion of the cam, the member 75 will block rocking movement to the left or counter-clockwise of the frame member 45 before it has moved so far that the stop member 73 can drop off the member 74, thus preventing any downward movement of the frame 45 and maintaining the barrier 44 in such a position that a pan 14 reaching said barrier 44 during the entire time that the locking member 75 is in lowered position will be halted by the barrier 44.

After the locking member 75 has been moved upwardly by engagement with the rising portion of the cam to a position with the bar 78 upwardly beyond the shoulder 72, then the cam member will be in such a position that it will support the frame 45 at a sufficient elevation that a pan 14 can not pass beyond the barrier 44. Accordingly there must be a pan 14 in engagement with the barrier 44 and the shoulder 62 of the cam 60 must be in such a position that the frame 45 can drop off the shoulder 62 before a pan or group of pans 14 can be discharged by lowering of the barrier 44. This assures that, whether there is a group of pans in position to be discharged on one conveyor, or on all the conveyors, or on any number of the conveyors 18, these will be discharged simultaneously onto the conveyor belt 38, at a time determined by the cams 60 and at no other time.

The cam shaft 61 is driven by means of the motor 79 mounted on the frame in a suitable manner, which has a sprocket 80 on the drive shaft thereof, over which the sprocket chain 81 operates, that operates over a sprocket wheel 82 on an adjustable speed reducer 83, by means of which the rate of rotation of the sprocket 84 on the output shaft of said adjustable speed reducer is controlled. A sprocket chain 85 operates over said sprocket wheel 84 and over a sprocket wheel 86 fixed on the cam shaft 61. Thus the cam shaft 61 is controlled as to its rate of rotation by means of the variable speed reduction gearing 83.

The rollers 23 are mounted on a shaft 87, said shaft 87 having collars 88 thereon for holding the same in proper position in the framework, and the shaft 25 is provided with similar collars 89. Also it will be noted that the pivot member 57 has collars 90 fixed thereto at opposite ends thereof to hold the links 54 and the brackets 55 in proper assembled relation.

In the operation of the unloader the variable speed reduction gearing 83 is adjusted so that the rate of rotation of the cam shaft 61 is such that it will rotate once for each lineal travel of the belt 38 through a distance equal to that between the outermost frame portions 39 on opposite sides of the frame of my unloading device, or slightly slower than that, so that the last set of pans 14 in a group that has been deposited on the conveyor belt 38 will be beyond the unloader by the time that the next set of pans is discharged by the unloader onto the conveyor belt 38. It is impossible for any group of connected pans 14 to be discharged from any of the conveyor belts 18 at any other time than when the cams reach the position where the followers of said cams can drop off the shoulders 62. This is due to the arrangement of the means for holding the pans on the conveyor belts comprising the barriers 44 and the mounting thereof, whereby the stop member 73 will be engaged with the shoulder formed by the flange 74 when the high portion 64 of the cam is reached and will remain there due to the provision of the locking member 75 moving to the position shown in Fig. 7, if no pan moves into engagement with the barrier during the time that the frame member 45 is in engagement with the high portion of the cam.

However, when a pan or a group of banded together pans does reach the barrier 44 while the barrier is in raised position due to engagement of the frame carrying the same with the high portion of the cam, then the movement of the pan due to the conveyor 18 will cause the parts to move first to the full line position shown in Fig. 6 and then to the dotted line position thereof to release the pan and thus release all pans, that are ready for delivery at the time that the shoulder 62 of the cam is engaged, simultaneously. As the cam operates at a speed slow enough that this can happen only at intervals sufficient for a length of conveyor 38 to have moved that all of the previously deposited pans will be out of the way, there is no possibility of any pan being deposited on top of another pan.

What I claim is:

1. Apparatus for unloading a traveling oven, comprising a plurality of conveyors extending therefrom, a conveyor extending transversely to said plurality of conveyors, and means for controlling transfer of pans from said plurality of conveyors to said transversely extending conveyor at spaced points along said transverse conveyor, said means including a releasable barrier associated with each of said plurality of conveyors, and means for individually releasing said barriers including timing means associated with each of said plurality of conveyors, means for operating said timing means in predetermined timed relation, means for locking said barriers against movement in a releasing direction responsive to said timing means, and means for holding said locking means against movement into locking position, said locking means being moved into engagement with said holding means by engagement of a pan with the barrier associated therewith while said locking means is out of locking position.

2. Apparatus for unloading a traveling oven, comprising a plurality of conveyors extending therefrom, a conveyor extending transversely to said plurality of conveyors, and means for controlling transfer of pans from said plurality of conveyors to said transversely extending conveyor at spaced points along said transverse conveyor, said means including a releasable barrier associated with each of said plurality of conveyors, and means for individually releasing said barriers including timing means associated with each of said plurality of conveyors, means for operating said timing means, and controlling means preventing release of said barriers responsive to said timing means except when both a pan in is engagement with a barrier and the timing means associated with the releasing means for said barrier is in barrier releasing position, comprising means responsive to said timing means for locking said barriers against movement in a releasing direction and means for holding said locking means out of locking position, said locking means being moved into engagement with said holding means by engagement of a pan with the barrier associated therewith while said locking means is out of locking position.

3. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising a barrier having a raised holding position and a lowered releasing position, cam means controlling the position of said barrier, means for locking said barrier in its raised position and pan actuated means for holding said locking means against movement into locking position.

4. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, said controlling means including a releasable barrier associated with each of said plurality of conveyors, said barrier having a raised holding position and a lowered releasing position, cam means controlling the position of said barrier, means for locking said barrier in its raised position and pan actuated means for holding said locking means against movement into locking position, said locking means being movable into cooperative relation with said holding means only when out of locking position.

5. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, said controlling means including a barrier associated with each of said plurality of conveyors, said barriers each being movable up and down into and out of holding position, and means controlling the position of each of said barriers, each of said controlling means comprising a member movable into and out of position to lock said barrier in raised holding position, a cam controlling the up and down movement of said barrier and movement of said locking member, and means for holding said locking member against movement into locking position responsive to said cam, said locking member being movable into engagement with said holding means by engagement of a pan with said barrier while in unlocking position.

6. Apparatus for unloading a traveling oven, comprising a plurality of parallel conveyors extending in side by side relation, a conveyor extending transversely to said plurality of conveyors, means for operating said conveyors to move said transverse conveyor at a much higher speed than said parallel conveyors, means for controlling transfer of pans from said parallel conveyors to said transverse conveyor, and means for periodically operating said controlling means at intervals greater than that required for movement of said transverse conveyor through a distance equal to the combined width of said parallel conveyors, said controlling means including means for releasing pans from each of said parallel conveyors, means for actuating said releasing means only at said intervals, and pan actuated means controlling operation of said actuating means to release only pans having a predetermined position on said parallel conveyors at said intervals, comprising barriers associated wtih each of said conveyors, said barriers each being movable up and down into and out of holding position, and means controlling the position of each of said barriers, each of said controlling means comprising a member movable into and out of position to lock said barrier in raised holding position, a cam controlling the up and down movement of said barrier and movement of said locking member, and means for holding said locking member against movement into locking position responsive to said cam, said locking member being movable into engagement with said holding means by engagement of a pan with said barrier while in unlocking position.

7. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable into and out of position to prevent transfer of pans from said parallel conveyors to said tranverse conveyor, means for holding each of said barriers in said position each comprising a barrier locking member movable into and out of barrier locking position, common means for moving said barriers and said members, and means operative to hold each of said members that is out of locking position out of said locking position upon engagement of a pan with the barrier it is adapted to hold.

8. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable into and out of position to prevent transfer of pans from said parallel conveyors to said transverse conveyor, means for holding each of said barriers in said position each comprising a member movable into and out of operative position, means for moving said barriers and said members, and means operative to hold each of said members that is out of operative position out of said operative position upon engagement of a pan with the barrier it is adapted to hold, said means for moving said members permitting each of said members to move into operative position when no pan is in engagement with the barrier it is adapted to hold.

9. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable into and out of position to prevent transfer of pans from said parallel conveyors to said transverse conveyor, cams for moving said barriers in synchronism, and pan actuated means cooperating with said cams to select the barriers moved out of position to prevent transfer of pans responsive to the position of said cams.

10. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position and means controlled by the position of said cams and pans on said parallel conveyors for releasing said barriers from said stop means.

11. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position and means controlled by the position of said cams and pans on said parallel conveyors for releasing said barriers from said stop means, comprising a member movable into position to prevent release of a barrier from said stop means unless a pan is in engagement with said barrier and said cams are in position to hold said barriers in raised position.

12. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position, said barriers being movable by said pans to disengage said stop means, and means for holding said barriers from movement to stop disengaging position.

13. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position, said barriers being movable by said pans to disengage said stop means, and means for holding said barriers from movement to stop disengaging position, said means being mounted for movement between a raised position and a lowered position by said cams independently of said barriers.

14. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position, said barriers being movable by said pans to disengage said stop means, and means for holding said barriers from movement to stop disengaging position, said means being mounted for movement between a raised position and a lowered position by said cams independently of said barriers, and being movable with said barriers in the direction in which said barriers are moved by said pans.

15. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position, said barriers being movable by said pans to disengage said stop means, and means for holding said barriers from movement to stop disengaging position, comprising a locking member slidably mounted on each of said barriers and movable between a lowered locking position and a raised releasing position under control of the cam for raising and lowering said barrier.

16. Apparatus for unloading a traveling oven, comprising a plurality of parallel conveyors extending in side by side relation, a conveyor extending transversely to said plurality of conveyors, and means for controlling transfer of pans from said plurality of conveyors to said transversely extending conveyor at spaced points along said transverse conveyor, comprising barriers movable between a lowered pan releasing position and a raised pan holding position, cams for raising and lowering said barriers, stop means for holding said barriers in raised position, said barriers being movable by said pans to disengage said stop means, and means for holding said barriers from movement to stop disengaging position, comprising a locking member slidably mounted on each of said barriers and movable between a lowered locking position and a raised releasing position under control of the cam for raising and lowering said barrier, and stop means engaged by said locking member in its raised position upon engagement of a pan with said barrier to hold said locking member in its raised position.

17. Apparatus for controlling discharge of pans from a conveyor to a conveyor extending transversely thereto comprising a barrier movable into and out of position to prevent discharge of said pans from said first conveyor, means for holding said barrier in said position comprising a locking member movable into and out of locking position, means for moving said barrier and locking member, and means operative to hold said locking member out of locking position upon engagement of a pan with said barrier, said means for moving said locking member permitting said locking member to move into barrier locking position when no pan is in engagement with said barrier.

18. Apparatus for controlling discharge of pans from a conveyor to a conveyor extending transversely thereto comprising a barrier movable between a lowered pan releasing position and a raised pan holding position, a cam for raising and lowering said barrier, stop means for holding said barrier in raised position, and means controlled by the position of said cam and a pan on said first conveyor for releasing said barrier from said stop means, comprising a member movable into position to prevent release of said barrier from said stop means unless a pan is in engagement with said barrier and said cam is in position to hold said barrier in raised position.

19. Apparatus for controlling discharge of pans from a conveyor to a conveyor extending transversely thereto comprising a barrier movable between a lowered pan releasing position and a raised pan holding position, a cam for raising and lowering said barrier, stop means for holding said barrier in raised position, and means controlled by the position of said cam and a pan on said first conveyor for releasing said barrier from said stop means, comprising a member movable into position to prevent release of said barrier from said stop means unless a pan is in engagement with said barrier and said cam is in position to hold said barrier in raised position, said member being mounted for movement by means of said cam independently of said barrier.

20. Apparatus for controlling discharge of pans from a conveyor to a conveyor extending transversely thereto comprising a barrier movable between a lowered pan releasing position and a raised pan holding position, a cam for raising and lowering said barrier, stop means for holding said barrier in raised position, said barrier being movable by the engagement of a pan therewith to disengage said stop means, and means for holding said barrier from movement to stop disengaging position, comprising a locking member slidably mounted on said barrier and movable between a lowered locking position and a raised releasing position under control of said cam.

MERLIN A. STICELBER.

REFERENCES CITED

The following references are of record in the file of this patent:

UNITED STATES PATENTS

| Number | Name | Date |
|---|---|---|
| 1,086,886 | Bernheim | Feb. 10, 1914 |
| 1,281,579 | Johnson | Oct. 15, 1918 |
| 1,589,079 | Johnson | June 15, 1926 |
| 1,612,215 | Phelps | Dec. 28, 1926 |
| 1,980,411 | Kimball | Nov. 13, 1934 |
| 2,047,406 | Copping | July 14, 1936 |